(No Model.)
C. F. NOBLE.
CHAIN COUPLING.
No. 524,182. Patented Aug. 7, 1894.
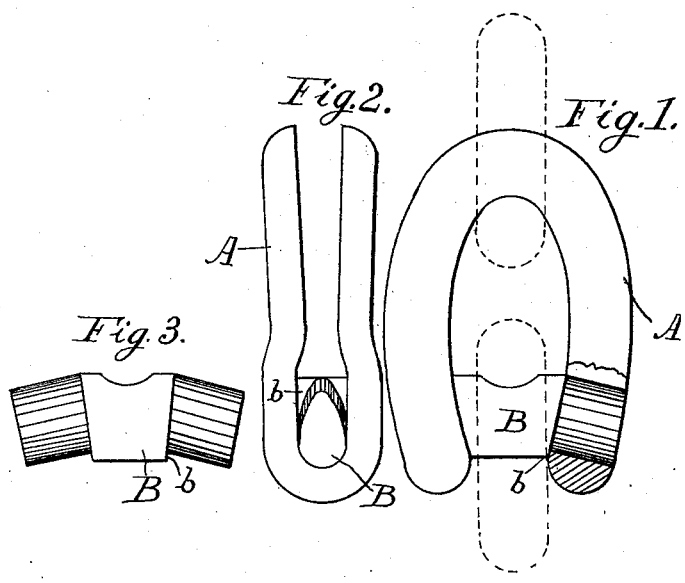
Witnesses:
Wm. A. Goodwin.
E. Dudley Freeman
Inventor:
Cyrus F. Noble
by S. W. Bates
his atty.

UNITED STATES PATENT OFFICE.

CYRUS F. NOBLE, OF BALDWIN, MAINE.

CHAIN-COUPLING.

SPECIFICATION forming part of Letters Patent No. 524,182, dated August 7, 1894.

Application filed February 12, 1894. Serial No. 499,855. (No model.)

*To all whom it may concern:*

Be it known that I, CYRUS F. NOBLE, a citizen of the United States, residing at West Baldwin, in the county of Cumberland and State of Maine, have invented certain new and useful Improvements in Chain-Couplings; and I do hereby declare the following to be a full, clear, and exact description of the invention, such as will enable others skilled in the art to which it appertains to make and use the same.

My invention relates to a device for coupling chains and it relates particularly to a modification of the invention shown in Letters Patent No. 486,587, issued to me November 22, 1892. In the chain coupling referred to, the link was doubled on itself to form an incomplete eye and the double headed bolt was slipped into place between the separated ends of the link, the ends being finally pressed together to hold the bolt in place. It was necessary in this device to leave the ends of the link separated far enough to admit the bolt and allow it to be slid laterally into place and in coupling some kinds of chains, notably cable chains, the links are so large and the space within the links so small that it was found impracticable to slip the small cable links over the spread ends of my coupling link.

The object of my invention therefore is to construct a coupling link which shall go together in the same general manner as my former link but which shall be so constructed as to provide for less spread of the ends and in which the bolt may be inserted endwise into the eyes of the link. In order to accomplish this purpose I separate the ends of my link only far enough so that when they are pressed together they will properly bind the bolt and the bolt is made small enough at the ends so that it may be inserted lengthwise, it being provided with shoulders or projections inside the eye.

I have illustrated my invention in the accompanying drawings, in which—

Figure 1 is a face or front view of the link after it is put together. Fig. 2 is a side or edge view of the same and Fig. 3 is a view of the bolt.

A represents the link which I prefer to cast in the shape herein shown from malleable iron or steel. It is bent or folded on its center to form two incomplete eyes the ends being left a short distance apart. The bolt or pin B is formed preferably without any enlargements or heads on the ends and it is small enough so that it can be inserted endwise into the eyes of the link. A shoulder or projection $b$ is formed on the bolt inside the eyes and adjacent thereto to prevent the bolt from slipping lengthwise. The ends of the bolt, I prefer to form as herein shown with an inclination downward, the eyes in which said ends fit being formed to correspond. Thus the draft on the bolt will have a tendency to draw the ends of the link together and the inclination of these ends aids the shoulder or projection in keeping the bolt in position.

In making use of the link it is passed through the two links to be coupled and the bolt is inserted as described, being slid endwise into the eyes. The link is then pressed or hammered together so that the eyes close around the ends of the bolt, holding it firmly in place. The necessary inclination is given to the eyes which receive the ends of the bolts by forming the link in the shape of a horse shoe as shown, the ends containing the eyes being drawn inward. The bolt, I prefer to make oblong in cross section the greatest dimension being in the direction of the strain. It will be seen that this link when put together is strong and serviceable and it can be quickly set up by simply adjusting the parts and hammering the free ends of the link together.

By providing for the introduction of the bolt endwise into the eyes of the link it is not necessary to separate the free ends of the links as far as in my other coupling and it is consequently adapted for use with chains having large and thick links with relatively small openings inside the links.

I claim—

1. The herein described chain coupling consisting of a link bent or folded on itself to form two incomplete eyes, combined with a bolt adapted to be inserted endwise into said eyes, said bolt being provided with a shoulder or projection inside of each eye for retaining it in place, substantially as described.

2. The herein described chain coupling consisting of a link bent or folded on itself to form two incomplete eyes, the ends of said link containing the eyes being drawn in to bring said eyes out of line, combined with a bolt adapted to be inserted endwise into said eyes, the ends of said bolt being inclined to fit the said eyes and said bolt being provided with shoulders or projections inside of each eye for retaining it in place, substantially as described.

In testimony whereof I affix my signature in presence of two witnesses.

CYRUS F. NOBLE.

Witnesses:
G. W. SANBORN,
GEO. G. DOW.